US012597086B2

(12) United States Patent (10) Patent No.: US 12,597,086 B2
King et al. (45) Date of Patent: Apr. 7, 2026

(54) TILE REGION PROTECTION IN A GRAPHICS PROCESSING SYSTEM

(71) Applicant: Imagination Technologies Limited, Kings Langley (GB)

(72) Inventors: Ian King, Hertfordshire (GB); Jamie Broome, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/703,494

(22) Filed: Dec. 4, 2019

(65) Prior Publication Data

US 2020/0175645 A1 Jun. 4, 2020

(30) Foreign Application Priority Data

Dec. 4, 2018 (GB) ...................................... 1819810

(51) Int. Cl.
G06T 1/20 (2006.01)
G06T 1/60 (2006.01)
G06T 11/20 (2006.01)
(52) U.S. Cl.
CPC .................. G06T 1/20 (2013.01); G06T 1/60 (2013.01); G06T 11/203 (2013.01); *G06T 2210/12* (2013.01); *G06T 2210/52* (2013.01); *G06T 2210/61* (2013.01)
(58) Field of Classification Search
CPC ............. G06F 11/0796; G06F 11/1641; G06F 11/1004; G06F 2201/83; G06F 2201/845; G06T 11/203; G06T 15/00; G06T 1/20;

G06T 1/60; G06T 2210/12; G06T 2210/52; G06T 2210/61; G06T 2207/30108; G06T 7/001; G09G 2330/08; G09G 2330/10;

(Continued)

(56) References Cited

U.S. PATENT DOCUMENTS

| 5,764,963 A * | 6/1998 | Ware ..................... G11C 7/1015 345/530 |
| 2006/0176303 A1* | 8/2006 | Fairclough .............. G06T 15/50 345/426 |
| 2014/0181594 A1 | 6/2014 | Sridharan et al. |

(Continued)

FOREIGN PATENT DOCUMENTS

| EP | 3109830 A1 | 12/2016 |
| GB | 201602120 | 3/2016 |

(Continued)

*Primary Examiner* — Jin Cheng Wang
(74) *Attorney, Agent, or Firm* — Potomac Law Group, PLLC; Vincent M DeLuca

(57) ABSTRACT

A graphics processing system for performing tile-based rendering of a scene that includes safety-critical elements. The graphics processing system includes a geometry engine configured to, in a geometry processing phase, identify protected tiles that include safety-critical elements; a fragment processing engine configured to, in a fragment processing phase, process each of the protected tiles first and second times so as to, respectively, generate first and second fragment-processed outputs; and a check unit configured to, for each of the protected tiles, compare the first and second fragment-processed outputs and raise a fault signal if the first and second fragment-processed outputs do not match.

18 Claims, 5 Drawing Sheets

(58) Field of Classification Search
CPC ......... G09G 2330/12; G09G 2330/238; G09G
5/363; G09G 2380/12
See application file for complete search history.

(56) References Cited

U.S. PATENT DOCUMENTS

| | | | |
|---|---|---|---|
| 2014/0368513 A1 | 12/2014 | Lyashevsky et al. | |
| 2015/0279090 A1* | 10/2015 | Keramidas ........... | G06T 15/503 |
| | | | 345/505 |
| 2016/0071231 A1 | 3/2016 | Bargh et al. | |
| 2016/0138968 A1* | 5/2016 | Staudenmaier ......... | G09G 5/10 |
| | | | 250/208.1 |
| 2016/0189687 A1* | 6/2016 | Auchmann ............... | G06T 1/60 |
| | | | 345/634 |
| 2016/0379332 A1 | 12/2016 | Krutsch et al. | |
| 2017/0069132 A1 | 3/2017 | Howson et al. | |
| 2018/0079307 A1* | 3/2018 | Droysen Von Hamilton .............. | |
| | | | B60K 35/10 |
| 2018/0165814 A1* | 6/2018 | Gulati .................... | G06T 7/001 |
| 2019/0056955 A1* | 2/2019 | Pennala ............... | G06F 9/5083 |
| 2019/0139263 A1* | 5/2019 | Gruber .................... | G06F 3/147 |
| 2019/0147281 A1* | 5/2019 | Atac ...................... | G06V 10/23 |
| | | | 382/100 |
| 2019/0171538 A1* | 6/2019 | Gulati ....................... | G06T 1/20 |
| 2019/0196926 A1* | 6/2019 | Jong .................... | G06T 7/0002 |
| 2019/0197651 A1* | 6/2019 | Johnson ................. | G06T 7/001 |
| 2019/0286115 A1* | 9/2019 | Wang .................... | G06F 9/3877 |
| 2019/0308099 A1* | 10/2019 | Lalonde .................. | G06T 1/60 |
| 2020/0198466 A1* | 6/2020 | Gulati .................. | B60K 35/00 |
| 2021/0064905 A1* | 3/2021 | Gulati .................. | G06F 3/0482 |
| 2021/0103455 A1* | 4/2021 | Peter .................... | G06F 9/4881 |

FOREIGN PATENT DOCUMENTS

| | | |
|---|---|---|
| GB | 2548469 A | 9/2017 |
| WO | 2017134452 A1 | 8/2017 |

* cited by examiner

TILE REGION PROTECTION IN A GRAPHICS PROCESSING SYSTEM

BACKGROUND

The present disclosure relates to graphics processing systems and methods of processing tasks at graphics processing systems.

In safety-critical systems, at least some of the components of the system must meet safety goals sufficient to enable the system as a whole to meet a level of safety deemed necessary for the system. For example, in most jurisdictions, seat belt retractors in vehicles must meet specific safety standards in order for a vehicle provided with such devices to pass safety tests. Likewise, vehicle tyres must meet specific standards in order for a vehicle equipped with such tyres to pass the safety tests appropriate to a particular jurisdiction. Safety-critical systems are typically those systems whose failure would cause a significant increase in the risk to the safety of people or the environment.

Data processing devices often form an integral part of safety-critical systems, either as dedicated hardware or as processors for running safety-critical software. For example, fly-by-wire systems for aircraft, driver assistance systems, railway signalling systems and control systems for medical devices would typically all be safety-critical systems running on data processing devices. Where data processing devices form an integral part of a safety-critical system it is necessary for the data processing device itself to satisfy safety goals such that the system as a whole can meet the appropriate safety level. In the automotive industry, the safety level is normally an Automotive Safety Integrity Level (ASIL) as defined in the functional safety standard ISO 26262.

Increasingly, data processing devices for safety-critical systems comprise a processor running software. Both the hardware and software elements must meet specific safety goals. Software failures are typically systematic failures due to programming errors or poor error handling. For software, the safety goals are typically achieved through rigorous development practices, code auditing and testing protocols. For the hardware elements of a data processing device, such as processors, safety goals may be expressed as a set of metrics, such as a maximum number of failures in a given period of time (often expressed as Failures in Time, or FIT), and the effectiveness of mechanisms for detecting single point failures (Single Point Failure Mechanisms, or SPFM) and latent failures (Latent Failure Mechanisms, or LFM). It is important that data processing hardware is designed to handle some level of errors because, even if systematic errors could be completely excluded from a safety-critical system, random errors can be introduced into hardware, e.g. by transient events (e.g. due to ionizing radiation, voltage spikes, or electromagnetic pulses). In binary systems transient events can cause random bit-flipping in memories and along the data paths of a processor.

There are various approaches to achieving safety goals in data processing hardware: for example, by providing redundancy so that if one component fails another is available to perform the same task, or through the use of check data (e.g. parity bits or error-correcting codes) to allow the hardware to detect and/or correct for minor data corruptions. Data processors can be provided in a dual lockstep arrangement 100 as shown in FIG. 1 in which a pair of identical processing cores 101 and 102 are configured to process a stream of instructions 103 in parallel. The output of either one of the processing cores (101) may be used as the output 104 of the lockstep processor. When the outputs of the processing cores 101 and 102 do not match, a fault can be raised to the safety-critical system. However, since a second processing core is required, dual lockstep processors necessarily consume double the chip area compared to conventional processors and consume approximately twice the power.

A delay 105 can be introduced on the input to one of the cores so as to improve the detection probability of errors induced by extrinsic factors such as ionizing radiation and voltage spikes (with typically a corresponding delay 106 being provided on the output of the other core). By adding further processor cores to a lockstep processor 100, it can be possible to continue to provide an error-free output: the output of the processor may be that provided by two or more of its processing cores, with the output of a processing core which does not match the other cores being disregarded. However, this further increases the area and power consumption of the processor.

Advanced driver-assistance systems and autonomous vehicles may incorporate data processing systems that are suitable for such safety-critical applications which have significant graphics and/or vector processing capability, but the increases in the area and power consumption (and therefore cost) of implementing a dual lockstep processor might not be acceptable or desirable. For example, driver-assistance systems often provide computer-generated graphics illustrating hazards, lane position, and other information to the driver. Typically this will lead the vehicle manufacturer to replace a conventional instrument cluster with a computer-generated instrument cluster which also means that the display of safety-critical information such as speed and vehicle fault information becomes computer-generated. Such processing demands can be met by graphics processing units (GPUs). However, in the automotive context, advanced driver-assistance systems typically require a data processing system which meets ASIL level B of ISO 26262.

Autonomous vehicles must in addition process very large amounts of data (e.g. from RADAR, LIDAR, map data and vehicle information) in real-time in order to make safety-critical decisions. Graphics processing units can also help meet such processing demands but safety-critical systems in autonomous vehicles are typically required to meet the most stringent ASIL level D of ISO 26262.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a graphics processing system for performing tile-based rendering of a scene that includes safety-critical elements, the graphics processing system comprising: a geometry engine configured to, in a geometry processing phase, identify protected tiles that include safety-critical elements; a fragment processing engine configured to, in a fragment processing phase, process each of the protected tiles first and second times so as to, respectively, generate first and second fragment-processed outputs; and a check unit configured to, for each of the protected tiles, compare the first and second fragment-processed outputs and raise a fault signal if the first and second fragment-processed outputs do not match.

The fragment processing engine may be configured to perform fragment processing a single time for those tiles of a frame to be rendered which are not identified as including safety-critical elements.

The graphics processing system may comprise one or more processing units each operable to perform the geometry processing phase and/or the fragment processing phase.

The graphics processing system may comprise a plurality of processing units and the fragment processing phase may be performed for the first time at a first processing unit of the plurality of processing units and for the second time at a second processing unit of the plurality of processing units.

The graphics processing system may be arranged to concurrently submit each protected tile to the first and second processing units.

The graphics processing system may comprise three or more processing units and may be configured such that the second processing unit is constrained to be any processing unit of the plurality of processing units other than the first processing unit.

The check unit may be configured to: form one or more first signatures which are characteristic of the output from the first processing unit; form one or more second signatures which are characteristic of the output from the second processing unit; and perform the comparison of the first and second fragment-processed outputs by comparing the respective first and second signatures.

The first and second processing units may be each configured to write their respective first and second fragment-processed outputs by performing one or more writes to one or more buffers at a data store and the check unit may be configured to form each first signature over groups of one or more writes by the first processing unit to the one or more buffers and to form each second signature over groups of one or more writes by the second processing unit to the one or more buffers.

The graphics processing system may be configured to allow writes by the first processing unit to the one or more buffers and to prevent writes by the second processing unit to the one or more buffers.

The fragment processing engine may be operable to write to a memory over a data bus and the graphics processing system may be configured to: designate the first processing unit as a mission processing unit and the second processing unit as a safety processing unit; allow writes to the memory by the mission processing unit; and not allow writes to the memory by the safety processing unit.

The geometry engine may be configured to perform the geometry processing phase first and second times for a frame to be rendered so as to, respectively, generate first and second geometry-processed outputs, and the check unit may be configured to compare the first and second geometry-processed outputs and raise a fault signal if the first and second geometry-processed outputs do not match.

The geometry engine may comprise a plurality of geometry units and the geometry processing phase may be at least partially performed for the first time at a first geometry unit of the plurality of geometry units and for the second time at a second geometry unit of the plurality of geometry units.

The check unit may be configured to: form one or more first signatures which are characteristic of the output from the first geometry unit; form one or more second signatures which are characteristic of the output from the second geometry unit; and perform the comparison of the first and second geometry-processed outputs by comparing the respective first and second signatures.

The first and second geometry units may be each configured to write their respective first and second geometry-processed outputs by performing one or more writes to a buffer at a data store and the check unit may be configured to form each first signature over groups of one or more writes by the first geometry unit to the buffer and to form each second signature over groups of one or more writes by the second geometry unit to the buffer.

The geometry engine may be configured to perform tiling so as to identify which elements are included in each of the tiles of a frame to be rendered, and to mark as protected tiles those tiles which at least partially include safety-critical elements.

The geometry engine may be operable to write to a memory over a data bus and the graphics processing system may be configured to: designate the first geometry unit as a mission geometry unit and the second geometry unit as a safety geometry unit; allow writes to the memory by the mission geometry unit; and not allow writes to the memory by the safety geometry unit.

The geometry engine may be arranged to receive geometry data defining the elements in the scene and the geometry processing phase may comprise transforming the geometry data into transformed geometry data representing the elements from the point of view of a frame to be rendered.

The geometry engine may be configured to: perform tiling first and second times in respect of all of the tiles of a frame so as to, respectively, generate first and second tiled outputs; and at the check unit, compare the first and second tiled outputs and raise a fault signal if the first and second tiled outputs do not match.

The graphics processing system may further comprise an interface for receiving draw calls that define the elements of the scene, the interface being configured to allow draw calls to be identified as safety-critical so as to cause the respective elements to be handled at the graphics processing system as safety-critical elements.

Each draw call received at the interface may include an identifier indicating whether the respective element is a safety-critical element.

The data store may comprise one or more memories located at or external to a graphics processing unit of the graphics processing system and/or one or more caches located at or external to a graphics processing unit of the graphics processing system.

Each protected tile may be for processing according to a predefined safety level.

There is provided a method of performing tile-based rendering of a scene that includes safety-critical elements, the method comprising: in a geometry processing phase, identifying protected tiles which include safety-critical elements; in a fragment processing phase, processing each of the protected tiles first and second times so as to, respectively, generate first and second fragment-processed outputs; for each of the protected tiles, comparing the first and second fragment-processed outputs and raising a fault signal if the first and second fragment-processed outputs do not match.

The method may further comprise, in the fragment processing phase, processing a single time tiles which are not identified as including safety-critical elements.

There is provided a graphics processing unit for performing tile-based rendering of a scene that includes safety-critical elements, the graphics processing unit being configured to: receive data relating to protected tiles that include safety-critical elements and data relating to non-protected tiles that do not include safety-critical elements; in a fragment processing phase: process each protected tile first and second times so as to, respectively, generate first and second fragment-processed outputs; and process each non-protected tile a single time so as to generate a respective single fragment-processed output; wherein the graphics processing system comprises a check unit configured to compare the first and second fragment-processed outputs for each protected tile and raise a fault signal if the first and second fragment-processed outputs do not match.

The graphics processing unit may be configured to write each first fragment-processed output and each single fragment processed output to a data store, and to prevent each second fragment-processed output being written to the data store.

The graphics processing unit may comprise a plurality of processing units, including: a first processing unit configured to perform the first time fragment processing for each protected tile; and a second processing unit configured to perform the second time fragment processing for each protected tile.

The graphics processing unit may be configured to process each non-protected tile at any of the plurality of processing units.

The graphics processing unit may comprise three or more processing units and may be configured to process each non-protected tile at any of the plurality of processing units not including the first and second processing units.

There is provided a method of performing tile-based rendering of a scene that includes safety-critical elements, the method comprising: receiving data relating to protected tiles that include safety-critical elements and data relating to non-protected tiles that do not include safety-critical elements; in a fragment processing phase: processing each protected tile first and second times so as to, respectively, generate first and second fragment processed outputs; and processing each non-protected tile a single time so as to generate a respective single fragment processed output; and comparing the first and second fragment processed outputs and raising a fault signal if the first and second fragment processed outputs do not match.

The graphics processing system and/or graphics processing unit may be embodied in hardware on an integrated circuit. There may be provided a method of manufacturing, at an integrated circuit manufacturing system, the graphics processing system and/or graphics processing unit. There may be provided an integrated circuit definition dataset that, when processed in an integrated circuit manufacturing system, configures the system to manufacture the graphics processing system and/or graphics processing unit. There may be provided a non-transitory computer readable storage medium having stored thereon a computer readable description of an integrated circuit that, when processed in an integrated circuit manufacturing system, causes the integrated circuit manufacturing system to manufacture the graphics processing system and/or graphics processing unit.

There may be provided an integrated circuit manufacturing system comprising: a non-transitory computer readable storage medium having stored thereon a computer readable integrated circuit description that describes the graphics processing system and/or graphics processing unit; a layout processing system configured to process the integrated circuit description so as to generate a circuit layout description of an integrated circuit embodying the graphics processing system and/or graphics processing unit; and an integrated circuit generation system configured to manufacture the graphics processing system and/or graphics processing unit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings.

DETAILED DESCRIPTION

Figure 1:
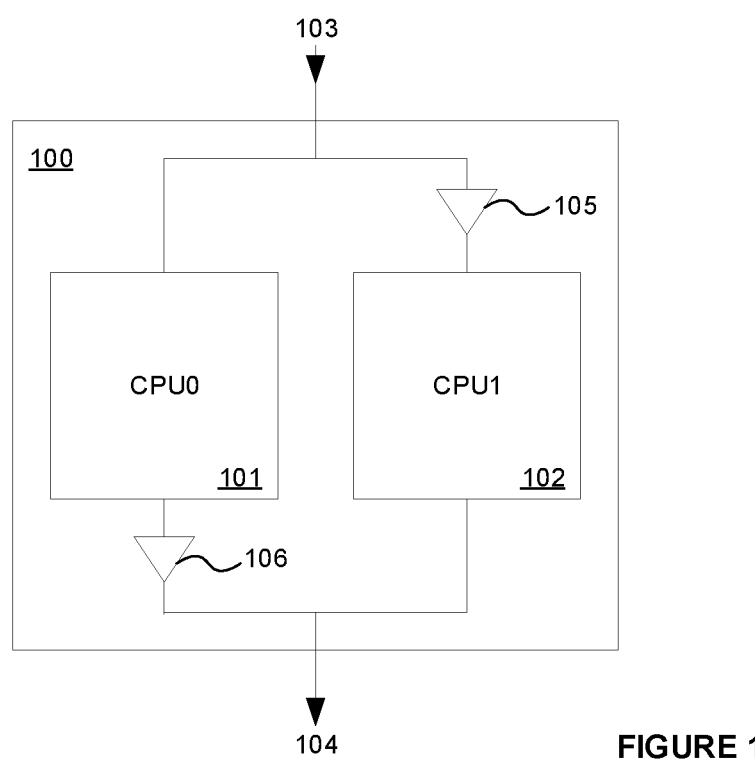
FIG. 1 shows a conventional dual lockstep processor.

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The present disclosure relates to a graphics processing system comprising one or more processing units for performing tile-based rendering of a scene. A graphics processing system configured in accordance with the principles herein may have any tile-based architecture—for example, the system could be operable to perform tile based deferred rendering. Each processing unit may be able to process a tile independently of any other processing unit. The processing units may be, for example, any kind of graphical and/or vector and/or stream processing units. Each processing unit may comprise a rendering pipeline for performing geometry processing and/or fragment processing of primitives of a scene. Each processing unit may be a different physical core of a GPU.

A tile may be any portion of a frame which is to be rendered at a graphics processing system. A frame may be all or part of an image or video frame. A processing unit may be configured to perform part or all of any aspect of graphics processing, including, for example, tiling, geometry processing, texture mapping, shading, depth processing, vertex processing, tile acceleration, clipping, culling, primitive assembly, colour processing, stencil processing, anti-aliasing, ray tracing, pixelization and tessellation. Different processing units may be configured to perform different aspects of rendering. In some examples, all of the processing units may be identical.

In general, a fragment processing engine includes those parts of a graphics processing system which are arranged to collectively or individually perform fragment processing. A fragment processing engine may comprise one or more functional units arranged in any manner as appropriate to the particular architecture of the graphics processing system. In general, a geometry engine includes those parts of a graphics processing system which are arranged to collectively or individually perform geometry processing, including tiling. A geometry engine may comprise one or more functional units arranged in any manner as appropriate to the particular architecture of the graphics processing system. Parts of a graphics processing system may be shared between its fragment processing engine and its geometry engine. The configuration of geometry units, tiling engines and processing units described herein and shown in the figures is provided by way of example and it will be appreciated that different configurations of the geometry units, tiling engines and processing units may be adopted in other architectures.

A graphics processing system configured in accordance with the principles described herein may be arranged to render any kind of scene. In some applications it is necessary to protect the rendering of a scene such that faults in the rendering process can be identified and suitable action taken. For example, in the automotive context, graphics processing systems may be used to render an instrument cluster for display at a dashboard display screen. The instrument cluster provides critical information to the driver, such as vehicle speed and details of any vehicle faults. It is important that such critical information is reliably presented to the driver and vehicle regulations would typically require that the critical information is rendered according to a predefined safety level, such as ASIL B of the ISO 26262 standard. The instrument cluster may additionally provide non-critical information such as the time and which radio station is selected.

Figure 2:
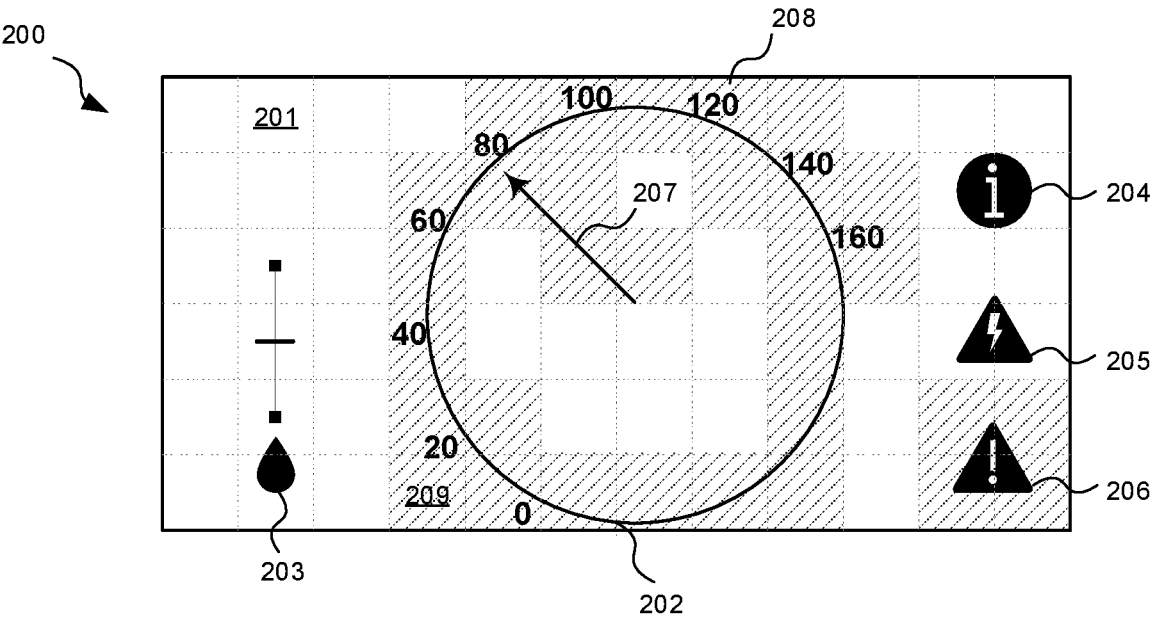
FIG. 2 shows a computer-generated instrument cluster for a vehicle.

FIG. 2 illustrates an instrument cluster 200 for rendering at a graphics processing system which will be referred to in the examples described herein. The instrument cluster comprises a speedometer 202 in the form of a traditional dial having speed values 208 around the edge of the dial and a needle 207 whose angular orientation indicates the current speed of the vehicle. The instrument cluster further comprises an oil temperature gauge 203, an information icon 204 (e.g. indicating the selected radio station), a non-critical warning icon 205 (e.g. indicating a fault with the air conditioning system), and a critical warning icon 206 (e.g. indicating a serious engine problem).

Only the speedometer 202 and the critical warning icon 206 of the display elements are critical to the safety of the vehicle and its occupants. It may be necessary to render those display elements in a manner which satisfies a mandated safety level, such as ASIL B of the ISO 26262 standard. The oil temperature gauge 203, information icon 204 and non-critical warning icon 205 do not need to be rendered to that safety level. One or more of the display elements 202 to 208 and/or a background to the display elements may require three-dimensional rendering. For example, the display elements could overlay a map illustrating the location of the vehicle and/or video feeds from one or more vehicle cameras.

The rendering space used to render the frame representing the rendered instrument cluster is divided into a plurality of tiles 201 each comprising a plurality of pixels. Only the highlighted tiles 209 include the critical display elements in that at least part of a critical display elements overlaps with each of the highlighted tiles. The highlighted tiles 209 are an example of the protected tiles discussed in more detail below.

Figure 3:
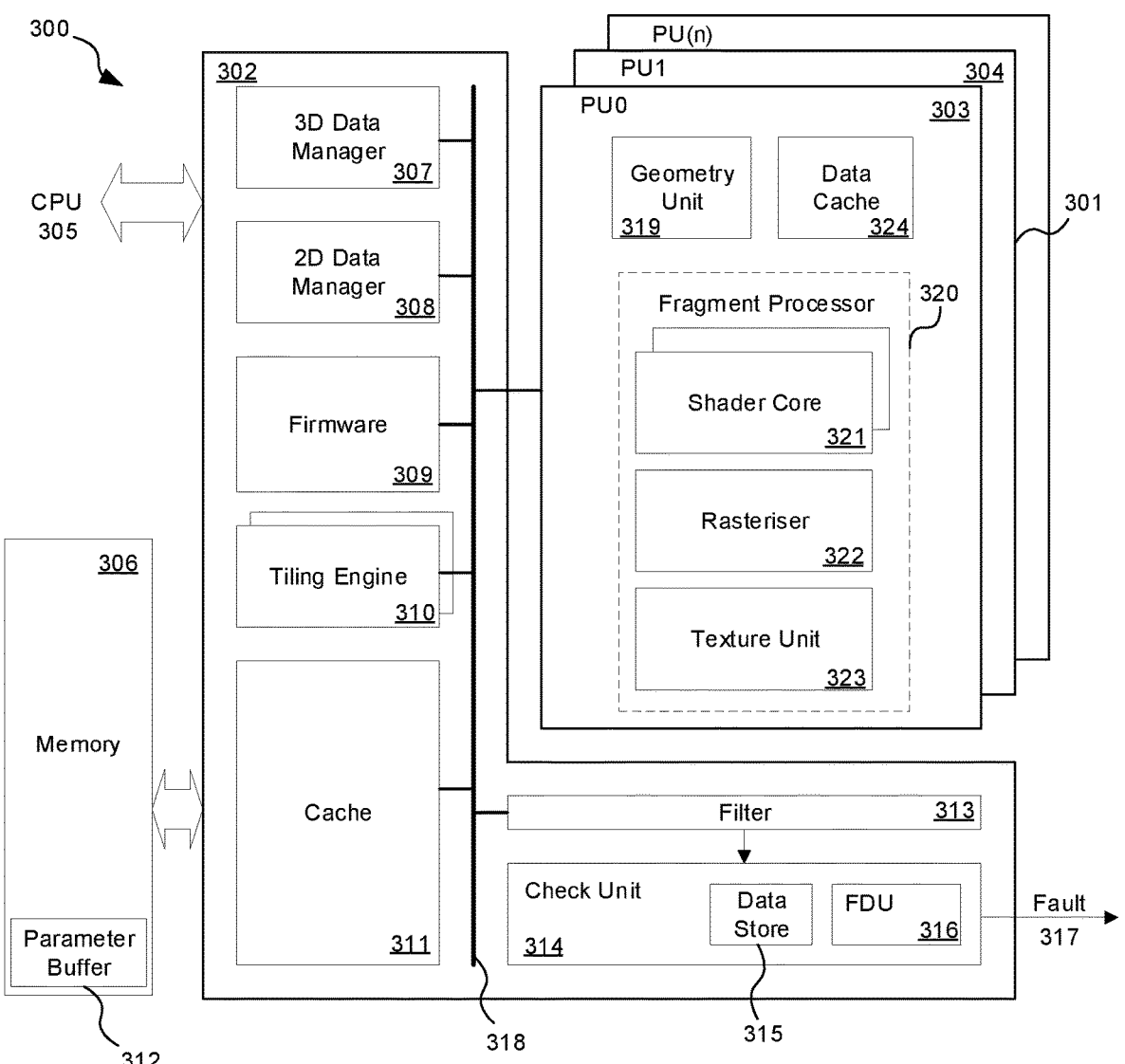
FIG. 3 shows a graphics processing system configured in accordance with the principles described herein.

A graphics processing system configured in accordance with the principles described herein is shown in FIG. 3 in the form of a graphics processing unit (GPU) 300. The GPU 300 is suitable for rendering the instrument cluster 200 shown in FIG. 2. The operation of the GPU will be described with reference to the exemplary flowchart shown in FIG. 6. The GPU 300 comprises a plurality of processing units 301, labelled in the figure as PU0 to PU(n). Only two processing units 303 and 304 are shown in FIG. 3 but typically there would be more. In general the GPU 300 may have any suitable architecture for performing tile-based rendering. In the example shown in FIG. 3, the GPU comprises a system portion 302 having various functional elements to, for example, process tiles and other data, communicate with external devices such as CPU 305 and memory 306, store data and support the processing performed at the processing units 301.

In FIG. 3, the system portion 302 comprises a 3D data manager 307 for controlling the three-dimensional rendering of tiles at the processing units 301 and a 2D data manager 308 for controlling the two-dimensional rendering of tiles. The system portion 302 further comprises firmware 309 which may, for example, perform low-level management of the GPU and provide an interface for control messages directed to the GPU. The operation of such units will vary depending on the particular architecture of the GPU. A data bus 318 may be provided over which the elements of the GPU and its processing units communicate.

A cache 311 may be provided at the GPU for receiving tiles for processing at the processing units 301 and/or receiving processed data from the processing units. In some examples, the cache may cache the contents of memory 306. Memory 306 may comprise a parameter buffer 312 into which the output of geometry processing (such as transformed geometry and tile lists) may be written for subsequent use when performing fragment processing.

Each of the plurality of processing units 301 may comprise a geometry unit 319 and a fragment processor 320. In some examples, geometry unit 319 and fragment processor 320 may share common hardware elements, e.g. arithmetic logic units (ALUs), which can be allocated to either geometry or fragment processing as required. The geometry unit is configured to process geometry data submitted 601 to the GPU. The geometry data represents the elements of a scene to be rendered. The geometry data may comprise, for example, one or more of: primitives to be rendered, vertex data describing geometric shapes in the scene, and objects to be rendered. An element of a scene may be one or more of: one or more primitives, vertex data relating to one or more geometric shapes (e.g. vertex data identifying coordinates of the vertices of one or more geometric shapes), and an object. For example, the geometry data may comprise a set of primitives representing the display elements of the instrument cluster shown in FIG. 2. Each primitive may be created by means of a suitable draw call from a software process arranged to generate the instrument cluster. A primitive may be a fundamental geometric shape from which the objects or other parts of a scene may be constructed. A primitive may be, for example, a triangle, a line, or a point.

In some examples, some aspects geometry processing may be performed at parts of the GPU other than the geometry unit 319. For example, geometry processing may be performed in part at fragment processor 320—e.g. vertex shading may be performed at a shader core 321.

In some examples tiling may be performed at a tiling engine 310, as is described below. In some examples, some aspects of fragment processing may be performed at parts of the GPU other than the fragment processor 320.

Geometry data (e.g. as generated in response to draw calls from a software process) may be held in memory 306 and read into cache 311 from the memory for processing at a processing unit. Each processing unit may comprise a data cache 324 for holding data to be processed at that processing unit and/or to receive the processed data generated at that processing unit. Geometry data for processing at a processing unit may be read into the data cache 324 of that processing unit.

The geometry unit 319 is configured to transform the geometry data describing the elements of a scene so as to form processed geometry data representing the scene from the point of view of the frame to be rendered. The processed geometry data may comprise transformed vertex data defining the primitives of the scene. The geometry unit may perform any suitable processing on the geometry data, including, for example, vertex processing (e.g. vertex shading), clipping, projection, culling and tiling.

In general, the processed geometry data may be generated at any part of the graphics processing system: for example, at a geometry unit of the same processing unit at which fragment processing is performed, at a geometry unit of a different processing unit to the processing unit at which fragment processing is performed, or at a geometry unit located elsewhere (for example, at system portion 312 of the GPU or in software).

The geometry unit performs at least part of a geometry phase of the process of rendering a scene at the graphics processing system. The geometry phase also comprises tiling: that is, identifying which elements of the scene fall within each tile of the frame to be rendered. Tiling may comprise generating for each tile a list of the elements (e.g. primitives) that fall within that tile.

In the example shown in FIG. 3, tiling is performed at tiling engines 310. Each tiling engine may be configured to operate on the processed geometry data received from a geometry unit 319 so as to identify which elements are included in each tile of the frame to be rendered. In some examples, the tiling of the processed geometry data into tiles may be performed at the geometry unit 319 or at any other part of the graphics processing system. Tiling may be performed according to any suitable algorithm—for example, using perfect tiling, a bounding box approach or a hierarchical tiling approach. Many such algorithms are known and will not be discussed further herein. A tile may be considered to include an element of a scene when any part of that element is calculated by the tiling algorithm to overlap with any part of the area of the tile—for example, when an element overlaps with all or part of any of the pixels of the tile.

Processed geometry data (e.g. transformed vertex data) for the scene as a whole may be stored. Furthermore, for each tile of the frame to be rendered, a list of the elements (e.g. the primitives) that overlap with that tile may also be stored. In this manner the list of elements may refer to the transformed elements in the processed geometry data for the scene, avoiding duplicating storage of processed geometry data for such elements (e.g. due to elements of the scene overlapping more than one tile). In other examples, some or all of the processed geometry data required to perform fragment processing of each tile may be stored separately for each tile. "Tiles" may be submitted to processing units for fragment processing, in the sense that the output of the geometry phase in respect of a given tile of a frame to be rendered may be submitted to the processing units for fragment processing.

The processed data from the geometry phase (e.g. from the geometry unit 319 and/or tiling engines 310) may be stored at any suitable location for subsequent use in the fragment processing phase. For example, the output of geometry processing (such as transformed vertex data and tile lists) may be stored at memory 306 (e.g. at a parameter buffer 312) and may be accessed through cache 311. In some examples the processed data from the geometry phase may be held at a processing unit 301, such as at data cache 324.

Geometry processing is performed in respect of a complete frame to be rendered and not performed on a tile-by-tile basis. This is because until the geometry is processed it is not known, for example, where the elements of the scene are located in relation to the tiles of the frame to be rendered, the apparent size of the elements, and whether those elements are visible.

In some examples, the geometry unit 319 may be provided at a different processing unit to the fragment processor 320. The number of geometry units may differ from the number of fragment processors at the GPU. In some examples the graphics processing system may comprise a single geometry unit configured to repeat geometry processing in the manner described below.

Each fragment processor 320 is configured to perform fragment processing in a tile-based manner on the processed geometry data generated by geometry unit 319. For example, each fragment processor of the graphics processing system may be arranged to receive processed geometry data for one tile at a time. Since the GPU comprises a plurality of fragment processors (e.g. the fragment processors at processing units 303 and 304), different fragment processors may be arranged to concurrently perform fragment processing in respect of different tiles. The processed data from the geometry phase for a given tile may be provided in any suitable form. For example, the processed data from the geometry phase for a given tile may comprise: the list of elements for that tile and the transformed geometry data describing each of those elements, or the transformed geometry data for each of the elements identified in the list of elements for that tile.

Tiles may be allocated to processing units for fragment processing in any suitable manner. For example, the fragment processors of the plurality of processing units may be configured to collectively work through the tiles of a frame by arranging that, one tile at a time, each processing unit reads into its data cache 324 the processed geometry data for a tile from parameter buffer 312 at cache 311.

The fragment processor may be configured to perform any suitable processing on the processed geometry data of a tile. For example, the fragment processor may perform one or more of: texture processing, shader processing, rasterization, hidden surface removal, and alpha processing. The fragment processor may comprise one or more units (e.g. arranged in a pipeline) for performing different aspects of the fragment processing. For example, as shown in FIG. 3, the fragment processor may comprise a shader core 321 for performing shader processing and hidden surface removal, a rasteriser 322 for performing rasterization, and a texture unit 323 for performing texture processing. More than one of a given type of unit may be provided at the fragment processor pipeline—for example, in the example shown in FIG. 3, two shader cores are provided. Shader processing typically represents a substantial proportion of the fragment processing and can be readily distributed over a plurality of shader cores.

The processing unit at which each fragment processor is provided may comprise a data cache 324 for holding data associated with the processing performed by the fragment processor. The output of calculations performed during fragment processing may be written to one or more buffers—for example, one or more of: a colour buffer for storing colour values (e.g. of pixels), a depth buffer for storing depth values (e.g. of pixels) and a stencil buffer for storing an indication as to which parts (e.g. pixels) of a tile are to be rendered. Such buffers may be maintained in any manner appropriate to the GPU architecture, including at one or more of system memory 306, GPU cache 311, and processing unit data cache 324. The use of such buffers is well known in the art and will not be discussed in detail here.

The tile-based deferred rendering architecture illustrated in FIG. 3 is merely an example. In general the processing unit and the GPU may have any tile-based rendering architecture.

A graphics processing system configured in accordance with the principles of the present disclosure is operable to render frames that include safety critical display elements, such as the instrument cluster of FIG. 2. This will now be described by way of example with reference to the GPU shown in FIG. 3.

The geometry data received for processing at the geometry unit 319 may comprise elements (e.g. objects, primitives or other parts of a scene to be rendered) which are safety critical. Safety critical elements may be identified in the geometry data in any suitable manner. For example, vertex data which geometrically describes one or more primitives making up an object in a scene may comprise an identifier indicating whether or not those primitives are safety critical and are to be rendered accordingly.

Figure 5:
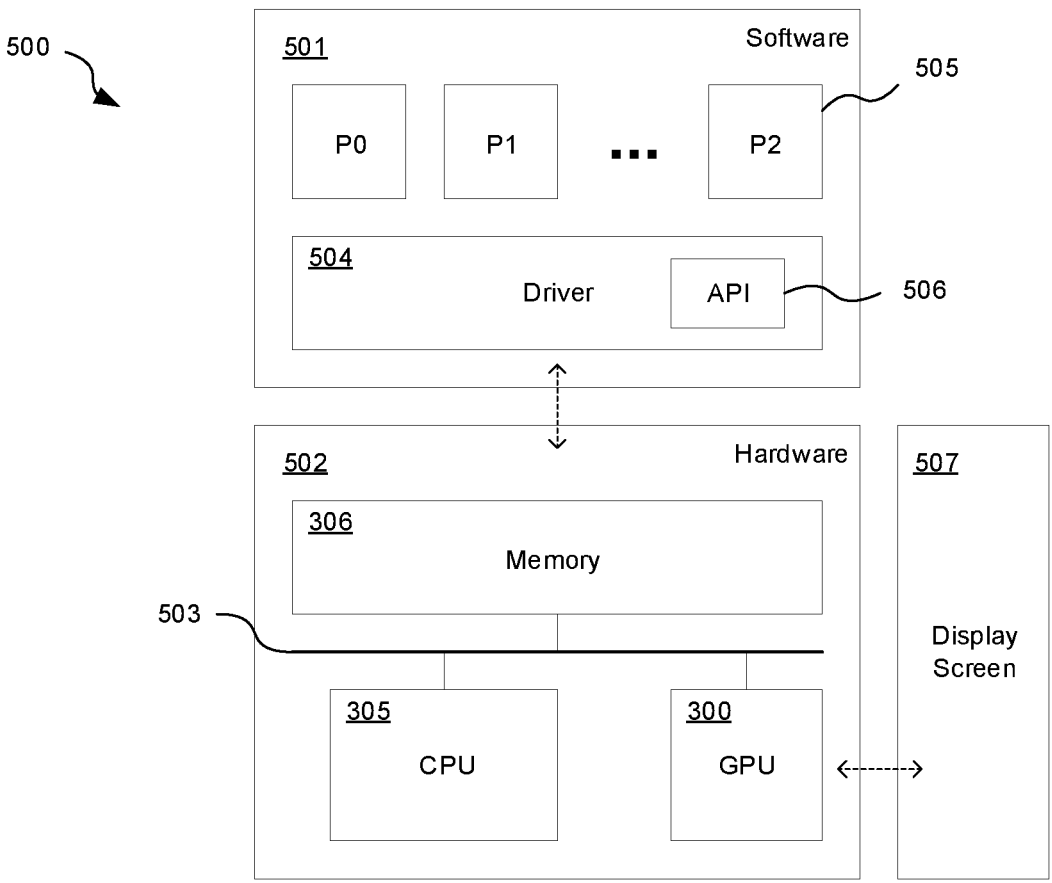
FIG. 5 shows a data processing system comprising a graphics processing system configured in accordance with the principles described herein.

A typical arrangement of a GPU at a data processing system is illustrated in FIG. 5, in which GPU 300 is shown in hardware 502 along with a memory 306 and a CPU 305. The GPU, CPU and memory may be arranged to communicate over a data bus 503. The data processing system comprises a software environment 501 which comprises one or more processes 505 and a driver 504 for the GPU. The driver provides an application programming interface (API) 506 arranged to receive draw calls from a process 505 so as to cause the GPU to render a scene to a display screen 507. For example, the API may be an OpenGL API and the process may be a software controller of the instrument cluster shown in FIG. 2 that is arranged to issue OpenGL draw calls so as to cause the GPU to render the instrument cluster to a display screen at the dashboard of a vehicle.

The source of the geometry data defining the scene to be rendered can identify which elements of the scene are safety critical. For example, a mechanism may be provided to enable a process to identify that a draw call or a group of one or more draw calls relates to a safety critical element. In the OpenGL framework, for example, the API calls glEnable( ) and glDisable( ) may be used to set a state bit for a draw call which indicates whether or not the draw call relates to a safety critical element. Suitable mechanisms may be provided at the driver (e.g. as a function of the driver which can be called by a process) or more generally at any combination of software, firmware and hardware. Such mechanisms can allow an application developer to control which parts of a scene are safety critical and so—in the manner which will now be described—which tiles of the frame to be rendered are to be protected.

In general the safety critical elements may be identified in any suitable manner, including, for example, by providing one or more identifiers with geometry data defining those elements (e.g. as one or more flags or as control messages with the data) and/or by means of a data structure (e.g. a lookup table) identifying which elements of the geometry data are safety critical and/or which elements of the geometry data are not safety critical.

A graphics processing system configured in accordance with the principles set out herein is configured to identify in the geometry phase which tiles of a frame to be rendered include safety critical elements. Such tiles may be referred to as protected tiles. Protected tiles may be processed at the graphics processing system in order to satisfy a predefined safety level. The identification of protected tiles may be performed during tiling. For example, on identifying which elements overlap with a given tile, if any of those elements are safety critical elements, that tile may be identified as being a protected tile. A protected tile may be marked in the graphics processing system in any suitable manner. For example, a protected tile may be identified by one or more of: an identifier (e.g. a flag) set in data output by the geometry phase (e.g. in the list of elements relating to that tile, or in a header structure relating to the list); a parameter in a control stream associated with a geometry data for a tile; and a data structure (e.g. a lookup table) identifying whether each tile of a frame is to be protected.

By identifying in the geometry phase which tiles include safety critical elements and providing that information with the processed geometry data for fragment processing, a graphics processing system configured in accordance with the principles described herein may be operable to process both protected tiles which include safety-critical elements and non-protected tiles which do not include safety-critical elements and which therefore do not need protected rendering. Each processing unit of the system may be arranged to process any given task independently of any other processing unit, allowing different processing units to process different tasks. In some examples, fragment processing of both protected and non-protected tiles may be concurrently processed at different processing units of the system. In some examples, fragment processing of both protected and non-protected tiles may be performed at the same processing unit.

Figure 6:
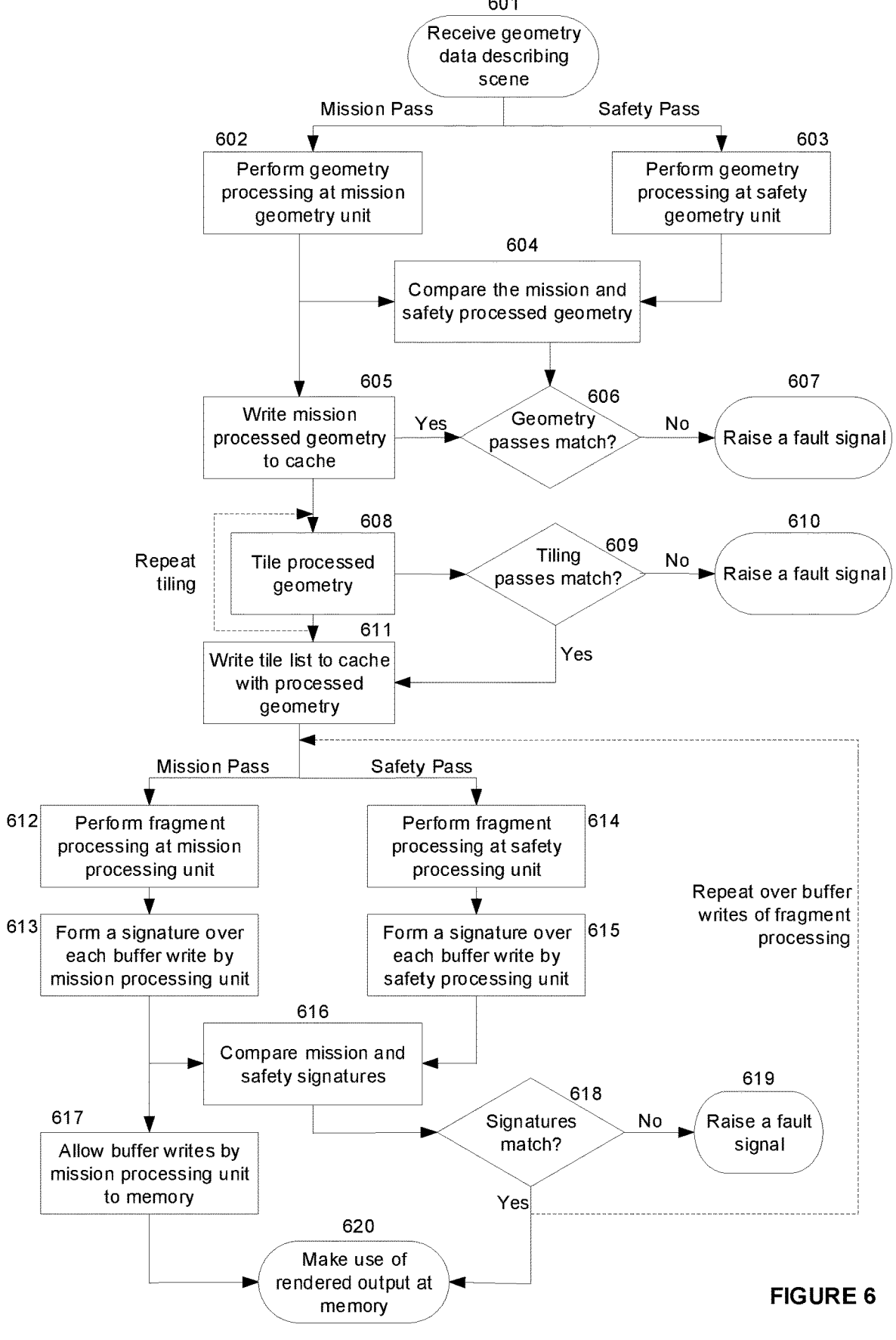
FIG. 6 is a flowchart illustrating the operation of a graphics processing system configured in accordance with the principles described herein.

The protected rendering performed by a graphics processing system configured in accordance with the principles set out herein will now be described in more detail with reference to FIG. 4 which schematically illustrates the rendering performed by GPU 300 by way of example and the flowchart shown in FIG. 6 which illustrates the operation of the GPU by way of example.

FIG. 4(a) illustrates the geometry phase, FIG. 4(b) illustrates the fragment processing phase and FIG. 4(c) the rendered tiles formed as the output of the rendering process in the event that faults do not occur during geometry or fragment processing.

Redundant Fragment Processing

The graphics processing system is configured to perform fragment processing at least twice on each protected tile and to compare the outputs of those passes to check that they match. If the outputs of the two fragment processing passes do not match, a fault signal may be raised to indicate that a fault has occurred. By performing such redundant processing, a graphics processing system configured in accordance with the principles described herein may be arranged to meet a required safety level in respect of its processing of protected tiles. The processing units configured to perform each processing pass of a protected tile may or may not be the same processing unit, depending on the particular implementation. Each processing pass of a given protected tile may or may not be processed concurrently with one or more other passes.

Any suitable approach may be used for distributing tiles to processing units for fragment processing and arranging that fragment processing is performed at least twice for protected tiles. In general, the GPU may have any kind of architecture and may utilise any scheme for distributing tiles to processing units. Fragment processing is performed once at a single processing unit for tiles which are not identified as being protected tiles (i.e. non-protected tiles).

In some examples, a GPU may be configured to designate one or more of its processing units as mission processing units and one or more of its processing units as safety processing units. Each mission processing unit may have a respective safety processing unit such that a protected tile is submitted to a mission processing unit and its respective safety processing unit. A graphics processing unit may be configured to designate mission and safety processing units—for example, on initialisation of the GPU (e.g. a software driver for the GPU may perform such designations) and/or dynamically at run-time in response to being arranged to render one or more new frames and/or tiles. The number of mission processing units may differ from the number of safety processing units designated at a GPU. In the examples shown in FIGS. 3 and 4, processing unit 303 is designated a mission processing unit and processing unit 304 is designated a safety processing unit for the purposes of performing fragment processing for a particular tile.

Once the geometry processing phase has completed, tiles may be submitted to the processing units for fragment processing. A protected tile (e.g. a tile which has an identifier set indicating that it is a protected tile which includes one or more safety critical elements) may be submitted to both mission and safety processing units (e.g. both of processing units 303 and 304) for processing—see 612, 614 in FIG. 6. A regular tile (e.g. a tile which does not have an identifier set because it does not include any safety critical elements) may be submitted to any of the processing units (e.g. either of processing units 303 and 304).

Tiles may be allocated to processing units for fragment processing by a component of the GPU. For example, for 3D workloads, the 3D data manager 307 may be configured to allocate tiles to processing units: on encountering a protected tile, the 3D data manager may allocate that tile to two processing units for fragment processing (e.g. both mission and safety processing units); on encountering a tile which is not identified as protected, the 3D data manager may allocate that tile to any one processing unit for fragment processing (e.g. either the mission or the safety processing unit). In some examples, the processed geometry data (e.g. transformed vertex data) making up a tile may be read from parameter buffer 312.

In some examples, the GPU may be configured to distribute tiles to processing units for fragment processing in dependence on the ability of processing units to process those tiles. For example, each processing unit may retrieve tiles for processing from parameter buffer 312 when the processing unit becomes able to receive a new tile for processing (e.g. on completing processing its current tile). This is illustrated by arrow 401 in FIG. 4 which represents geometry data being provided from the geometry phase to the highlighted fragment processors 320 for fragment processing. In some examples, tiles could be processed for a first time at any processing unit of the plurality of units and processed for a second (or further) time at any processing unit of the plurality of units. This means that tiles (whether on the first or a further pass) can be dynamically allocated to processing units so as to efficiently spread the processing load and avoid a situation in which processing units become idle unnecessarily.

In some examples, the graphics processing system may be configured such that protected tiles and non-protected tiles cannot be processed at the same processing unit. This can help avoid faults which occur when processing non-protected tiles from corrupting or stalling the processing performed on protected tiles. For example, the graphics processing system may be configured such that a processing unit designated for performing fragment processing of protected tiles may be prohibited from performing fragment processing of non-protected tiles. In some examples, a subset of the total number of processing units at the graphics processing system may be designated for processing protected tiles and a different subset of graphics processing units may be designated for processing non-protected tiles.

Figure 4:
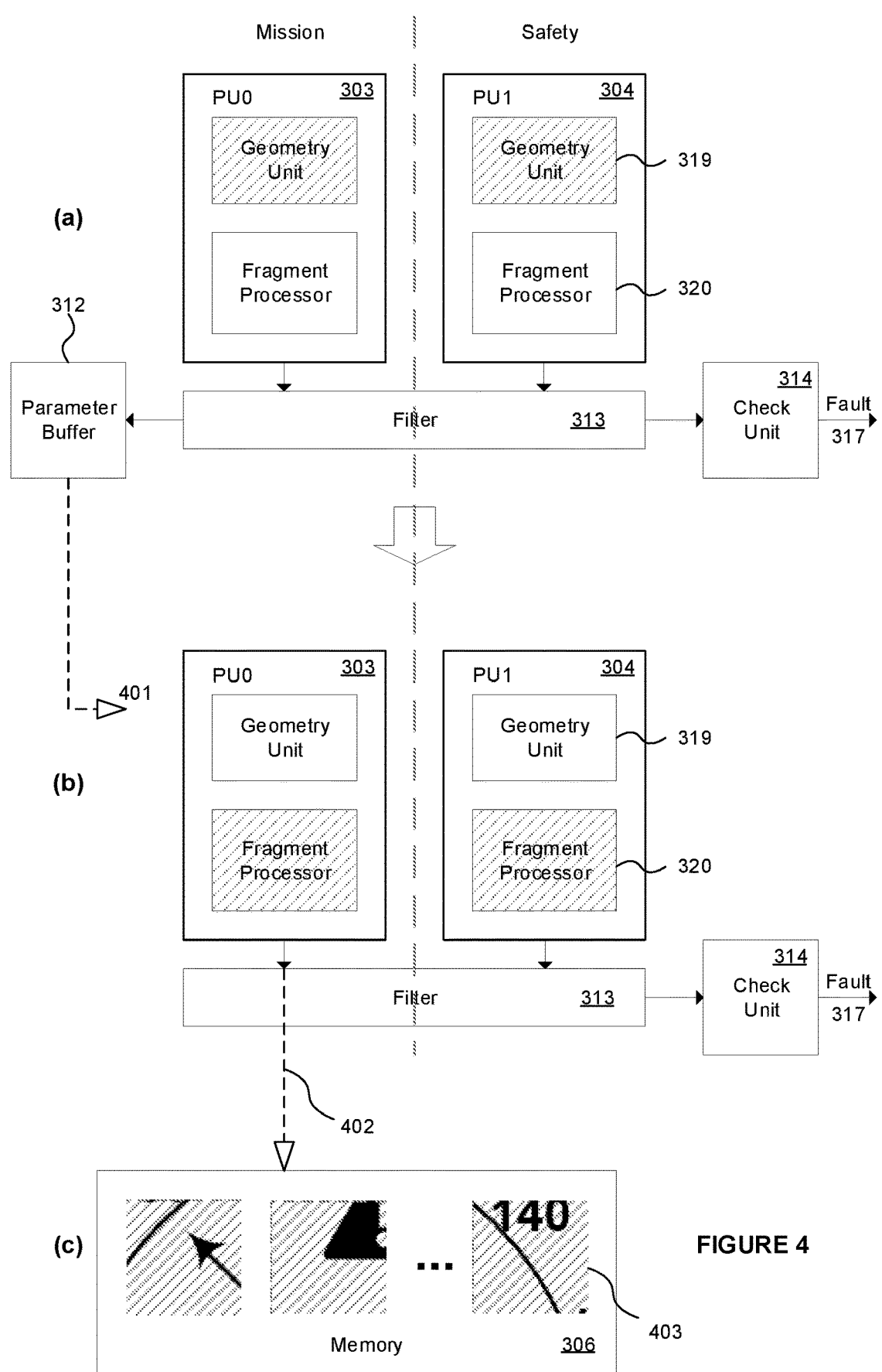
FIG. 4 is a schematic diagram illustrating the operation of a graphics processing system configured in accordance with the principles described herein.

Protected tiles may be submitted concurrently to different processing units for fragment processing—for example, in the manner illustrated in FIG. 4. Such an arrangement can help to reduce the read bandwidth consumed in reading from memory textures and other data that may be required during fragment processing. Such an arrangement can also offer protection over permanent faults specific to a given processing unit whilst still maintaining protection over transients due to the natural variation in time at which different processing units perform the same fragment processing calculation. This is because such data is likely to be available at a cache of the GPU (e.g. cache 311) for both fragment processing passes, avoiding the need to re-fetch that data from memory (e.g. memory 306). Note that, generally, the fragment processing performed at different processing units need not be synchronised: it is typically sufficient that different fragment processing passes of a tile occur closely enough in time that the required data is still available at the cache when the subsequent processing pass is performed. The likelihood of the required data being available may be controlled through appropriate choice of the size of the cache.

The output from each processing unit configured to perform fragment processing on a protected tile is compared to check whether those outputs match. The output data which is provided to the check unit from the processing units arranged to process a given protected tile may comprise writes to one or more buffers, such as one or more of a colour buffer, a stencil buffer and a depth buffer. In some examples, the output data provided to the check unit may be an intermediate or final rendered output for a tile. Checking the complete output of fragment processing performed in respect of a protected tile maximises the likelihood of capturing faults that occur during fragment processing and can help the GPU to achieve a high safety level. In other examples, the check unit may be configured to accumulate data relating to the outputs of fragment processing for all protected tiles in a frame, and to perform a comparison check on a per-frame rather than a per-tile basis.

In some examples, the fragment processors 320 are arranged to maintain one or more buffers to which the output of fragment processing calculations are written. For example, the fragment processors may maintain one or more of a colour buffer, a stencil buffer and a depth buffer. Such buffers may be held at the data cache 324 of the processing unit at which the fragment processing is performed. In some examples, the outputs of the processing units in the fragment processing phase are the writes to its respective buffers.

In FIG. 3, a filter 313 is provided to appropriately direct the outputs of the processing units. The filter is shown coupled to data bus 318 over which, in the example shown in FIG. 3, the various units of the GPU communicate. It will be appreciated that the filter shown in the figure is schematic and the direction of data around the GPU may be performed in many different ways, depending on the architecture of the GPU. In general, the flow of data around the GPU may be performed in any suitable manner and by any one or more units of the GPU.

On receiving output data from processing units in respect of a protected tile, the filter is configured to direct that output data to a check unit 314. The check unit is configured to compare the output data from different fragment processing passes of the same protected tile. The output data may be from the same or different processing units. In some examples, the output data formed in respect of a given protected tile is received from mission and safety processing units designated in the manner described above. In some examples, the output data from a processing unit arranged to perform fragment processing on a tile comprises the set of writes to one or more of its buffers (e.g. colour and/or stencil and/or depth buffers).

The output of the fragment processing phase may be a rendered tile suitable for writing to a frame buffer, potentially subject to one or more further processing steps (e.g. stitching and/or blending tiles together to create a seamless output frame). An example is shown in FIG. 4(c) of the protected rendered tiles 403 output by the fragment processing phase in respect of GPU 300 when applied to render the instrument cluster 200 of FIG. 2. The rendered tiles may be written to memory 306 (e.g. to a frame buffer).

In some examples, the check unit 314 is configured to directly compare the output data received from different fragment processing passes of the same protected tile—for instance, the check unit may stream the output data (e.g. buffer writes) from different passes and directly compare the data (e.g. at a bit, byte, word, or any other suitable level). The comparison of the output streams may be performed at a fault detection unit 316 of the check unit 314. One or more buffers may be provided at the check unit or elsewhere at the GPU in order to enable the check unit to compensate for a time offset between the output data streams received at the check unit (e.g. due to the fragment processing at one processing unit being ahead of the fragment processing at another processing unit or a single processing unit being configured to sequentially process a protected tile first and second times).

In some examples, the check unit 314 is configured to, for each fragment processing pass, form one or more signatures which are characteristic of the output data received from the respective processing unit. The check unit may be configured to form such signatures in any suitable manner. In some examples, the check unit is configured to form a signature over the complete output from a processing unit once fragment processing has been completed at that processing unit.

In some examples, the check unit is configured to form a signature over output data from a processing unit arranged to perform fragment processing of a protected tile. For example, the check unit may be configured to form a signature over sets of one or more writes by a fragment processor to its buffers—see 613 and 615 in FIG. 6. For example, each time a fragment processor writes to one of its colour, depth or stencil buffers, that write may be passed to the check unit 314 (e.g. by means of filter 313) for the check unit to generate a signature in respect of that write. One or more writes could be batched together for submission to the check unit with the check unit being configured to generate a signature over the writes of a batch. The signatures formed over the writes by a fragment processor to its buffers may be accumulated at data store 315. Signatures may be associated at the data store with information representing the protected tile to which the signature relates (e.g. an identifier or coordinate of the tile) and the buffer to which the signature relates (e.g. which of the colour, stencil and depth buffers the write was directed to in respect of which the signature was formed). Since the content of the buffers written to during fragment processing are representative of the fragment processing performed by the respective processing unit, the total set of signatures formed over the writes to the buffers made during fragment processing is representative of the complete processed output from that processing unit.

The check unit is configured to compare 616 the signatures formed in respect of each fragment processing pass for a tile so as to verify that the fragment processing performed in each pass is in agreement. A signature generated for a processing pass may be stored at data store 315 for subsequent use (e.g. comparison with the signature of another pass in respect of the same protected tile). A fault detection unit 316 may be configured to perform the comparison of signatures—for example, by comparing signatures held at the data store 315. The check unit may perform, for example, a checksum, a CRC, a hash or a fingerprint calculation on the output data. A signature provides an expression of the processing performed on a protected tile by a processing unit in a more compact form than the output data from that processing unit itself so as to facilitate comparison of the output data provided on different fragment processing passes. For example, a signature may provide a compact expression of the data written to a buffer during fragment processing. A fault detection unit 316 of the check unit 314 is configured to compare the signatures formed at the check unit in respect of a given protected tile. The comparison of signatures could be performed at any suitable level of granularity—for example, at a bit, byte, word level.

The fault detection unit 316 may be configured to begin comparing signature data formed in respect of a given pair of fragment processing passes before fragment processing completes for at least one of the pair of passes. This can allow a fault signal to be raised as early as possible and enable, for example, the respective fragment processing passes to be abandoned (and potentially restarted), minimising wasted processing at the GPU. In examples where each signature is formed in respect of one or more writes to a buffer, the fault detection unit 316 may be arranged to compare the corresponding signatures stored at the data store 315 from different processing passes of the same protected tile (and potentially the same buffer). Such processing passes may be being performed concurrently at a pair of processing units (e.g. mission and safety processing units) of the GPU. Signatures may be stored sequentially at the data store 315 for each processing pass of a protected tile so as to facilitate comparison of the signatures for corresponding buffer write operations at the fault detection unit.

In some examples, the check unit may be arranged to compare the output from processing units in respect of different fragment processing passes of the same protected tile only once processing of all of the protected tiles of a frame has completed. For instance, the check unit may be configured to generate signatures for fragment processed data in accordance with any of the approaches described herein and to accumulate those signatures at data store 315. Once all of the signatures are available for all of the protected tiles of a frame, the check unit 314 may be configured to perform a comparison between pairs of corresponding signatures at its fault detection unit 316 and, if any of the signatures do not match, raise a fault in respect of the frame as a whole.

The check unit may comprise a plurality of check unit instances—for example, each check unit instance may be configured to receive output data from a different subset of processing units of the GPU. Preferably the check unit additionally operates on memory addresses and/or control data comprised in the output from the processing unit—this can help the validation operations described herein to identify a wider range of faults.

The fault detection unit 316 is configured to raise 619 a fault signal 317 on determining that the fragment processing performed on different passes of the same protected tile do not match 618. As described, such comparison could be, for example, by comparing the fragment processed outputs directly and/or by comparing signatures characteristic of fragment processed outputs. A fault could potentially lead to a safety violation at the GPU. For example, a fault in rendering any of the protected tiles 209 of the instrument cluster shown in FIG. 2 could cause corruption of safety critical elements of the instrument cluster, such as the speedometer.

The fault signal 317 may be provided in any suitable manner. The fault signal may be provided as an output of the GPU 300. The fault signal may be, for example, one or more of: control data; data written out to memory 306; and data written to a register or memory of the GPU or a system to which the GPU is connected. A fault signal indicates that the processed outputs from different passes of the same protected tile are not the same and therefore the processed output from one or more of the processing unit(s) that generated those processed outputs is invalid. The outputs of processing unit(s) configured to process the same protected tile may differ due to transient events such as ionizing radiation or voltage spikes, or permanent errors due to bugs in some combination of hardware, software and firmware.

The fault detection unit 316 is for comparing output data generated on different passes of the same protected tile. Two or more processing units may be arranged to process the same protected tile. The processing performed on different passes may or may not be concurrent. If two processing passes are performed at two different processing units, comparing the output data generated by those processing units indicates whether the processing performed by the pair of processing units is in agreement: a fault signal indicates that a fault occurred at one of the processing units but does not indicate which unit experienced the fault.

If a group of three or more processing units are arranged to process the same protected tile, comparing the output data from those processing units indicates whether the processing performed by the processing units is in agreement. When the processed output of one of the group of processing units does not match the output of the other two processing units, the fault signal indicates that a fault occurred at one of the processing units of the group and it can further indicate at which one of the processing units of the group the fault occurred. This is because the fault can be assumed to have occurred at the processing unit whose output does not match the outputs from the two or more other processing units.

If the outputs from different fragment processing passes of the same tile do match, then the rendered tile generated at the graphics processing system may be considered valid and used in a manner appropriate to the application (e.g. in the example of FIG. 2, the rendered tile data may be part of instrument console 200). If the outputs from different fragment processing passes of the same tile do match then no fault signal may be raised or, in some examples, a signal may be raised indicating that the outputs do match.

The fault signal may be any kind of indication that a fault has occurred, including, for example, one or more of a control message, an interrupt, a flag in control data, one or more bits set at a register, and a data packet.

The graphics processing system may be configured to write out to external memory 306 (e.g. to a frame buffer) one or more of the processed outputs generated at the processing unit(s) in respect of each protected tile. The outputs generated in respect of a protected tile may be written out from only one of the processing passes performed for that tile so as to minimise the memory bandwidth consumed. In some examples, the filter 313 is configured to cause the processed outputs generated at the mission processing unit (e.g. writes to colour, stencil and depth buffers) to be written out to memory 617 and to cause the processed output generated at the safety processing unit not to be written out to memory. This is illustrated in FIG. 4 in which arrow 402 represents mission processing unit 303 writing data to memory 306 so as to form the rendered output tiles 403.

In some examples, the filter 313 is configured to cause the first available processed output (e.g. a write to a colour, stencil or depth buffer) from a processing unit in respect of a given protected tile to be written out to memory. In this way the rendered output is available sooner to a data processing system at which the GPU is located. In general, all or any one or more of the processed tile output data from processing units arranged to process a given protected tile may be written out to memory 306.

Should the fault detection unit determine that a rendered tile written out to external memory (or in a cache for writing to external memory) is invalid then the graphics processing system may be configured to cause that rendered tile to be discarded and/or marked as invalid.

Once fragment processing has completed for a given protected tile, the rendered tile output (e.g. at memory 306) may be available for use 620 as appropriate to the application. In the example that GPU 300 is configured to render instrument cluster 200, completed rendered tiles may be written to the physical display at which the instrument cluster is provided.

One approach to performing protected rendering is to render the entire scene twice and check that the rendered outputs match—for example, as might be performed at a pair of GPUs arranged in the dual lockstep configuration illustrated in FIG. 1. However, in many applications of a GPU, not all of the elements in a scene will be safety critical. For example, in FIG. 2 only around 40% of the tiles representing the rendered instrument cluster include safety critical elements. The present disclosure provides an efficient approach to protected rendering in which fragment processing is duplicated only for protected tiles which have been identified in the geometry phase as including safety-critical elements. Since fragment processing typically dominates the rendering performance of a GPU, the present approach can provide substantial performance benefits over conventional systems such as dual lockstep processors in which both processing cores must necessarily both perform the same rendering operations, even if those operations do not relate to safety-critical elements of a scene. A lockstep processor suffers from the problem that its two (or more) cores are locked together and cannot be individually utilised, leading to an inflexible 100% chip area cost in respect of every frame processed.

Redundant Geometry Processing

Errors in geometry calculations—even those which relate to non-safety critical elements of a scene—could cause elements to be written to protected tiles of a frame to be rendered. For example, with reference to FIG. 2, errors in geometry calculations relating to information icon 204 could cause the icon to be incorrectly rendered across one or more of the protected tiles 209, obscuring safety-critical elements of the instrument cluster. The geometry phase of rendering a frame which includes any safety critical elements is therefore performed at least twice at the graphics processing system and the outputs of each pass is compared to check that the geometry calculations are in agreement. If the outputs of geometry processing passes do not match, a fault signal may be raised to indicate that a fault has occurred. Such redundant geometry calculations may be performed according to any of the approaches described above for redundantly performing fragment processing. By performing redundant processing, a graphics processing system configured in accordance with the principles described herein may be arranged to meet a required safety level in respect of its processing of protected tiles.

The geometry unit configured to perform each geometry processing pass may or may not be the same geometry unit, depending on the particular implementation. For example, a geometry unit 319 may repeat processing of geometry data. This can be acceptable because typically fragment processing dominates over geometry processing in terms of the processing time required and in some architectures this can reduce data transfer at the GPU—e.g. in processing unit 301 the geometry data to be processed at geometry unit 319 may be maintained at the data cache 324 for re-use on the second pass thereby avoiding reading the geometry data from the cache 311 for a second time. However, repeating geometry processing at the same logic will not reveal some permanent errors which would simply be repeated on the second pass.

However, as described above different geometry processing passes for a frame may be performed at different geometry units. Such an arrangement can offer protection over permanent faults specific to a given geometry unit whilst still maintaining protection over transients due to the natural variation in time at which different geometry units perform the same geometry calculation. Each geometry processing pass for a given frame may or may not be processed concurrently with one or more other passes for that frame.

Any suitable approach may be used for distributing geometry data to geometry units for processing. In general, the GPU may have any kind of architecture and may utilise any scheme for distributing geometry data to geometry units. A check as to whether a scene includes any safety critical elements can be performed. Such a check could be performed anywhere at the graphics processing system. For example, its driver may determine whether any of the draw calls in respect of a frame identify an element as being safety critical: if so an identifier may be set for the frame as a whole indicating that the graphics processing system is to process the frame in a protected mode in which geometry processing is to be repeated. In other examples, it could be the responsibility of the application developer to identify that a frame includes safety critical elements and therefore geometry processing is to be repeated. For instance, a process could be configured by means of one or more calls to a graphics API and/or the GPU driver to cause the graphics processing system to enter a protected mode in which geometry processing is repeated and the output of the geometry processing passes compared.

If a frame does not include safety critical elements then geometry processing may be performed in the conventional manner just once at one or more geometry units of the graphics processing system.

In some examples, the graphics processing system is configured to designate one or more mission geometry units and one or more safety geometry units and geometry data may be submitted to both the mission and safety geometry units. A mission geometry unit may be designated at a mission processing unit and a safety geometry unit may be designated at a safety processing unit as described in the examples above for performing fragment processing. In some examples the one or more geometry units of the graphics processing system are not provided at the plurality of processing units. In examples where the geometry unit is provided at a processing unit—e.g. in the example shown in FIG. 3—a mission geometry unit may be the geometry unit at a designated mission processing unit and a safety geometry unit may be the geometry unit at a designated safety processing unit. The processing of geometry data at such mission 602 and safety 603 geometry units is shown in FIG. 6.

Each mission geometry unit may have a respective safety geometry unit such that geometry data for a frame that includes safety critical elements is submitted to a mission geometry unit and its respective safety geometry unit. A graphics processing unit may be configured to designate mission and safety geometry units—for example, on initialisation of the GPU (e.g. a software driver for the GPU may perform such designations) and/or dynamically at run-time in response to being arranged to render one or more new frames. The number of mission geometry units may differ from the number of safety geometry units designated at a GPU.

Geometry data may be allocated to geometry units for geometry processing by a component of the GPU. For example, for 3D workloads, the 3D data manager 307 may be configured to allocate geometry data to processing units. In examples in which the GPU includes a plurality of geometry units, the 3D data manager may allocate geometry data to two geometry units for processing (e.g. both mission and safety processing units). Geometry data may be allocated to a single geometry unit in the event that repeat geometry processing is not enabled (e.g. the frame to be rendered does not include any safety critical elements and/or the GPU is in a non-protected mode).

In some examples in which the GPU includes a plurality of geometry units, the GPU may be configured to distribute geometry data to geometry units in dependence on the ability of geometry units to process that data. For example, each geometry unit may retrieve geometry data for a frame from a buffer in memory 306 when the geometry unit becomes able to receive new geometry data for processing (e.g. on completing processing its current geometry data). In some examples, geometry data could be processed for a first time at any geometry unit of the plurality of units and processed for a second (or further) time at any geometry unit of the plurality of units. In this way, geometry data (whether on the first or a further pass) can be dynamically allocated to geometry units so as to efficiently spread the processing load and avoid having idle geometry units.

The output from each geometry processing pass is compared 604 to check whether those outputs match. This comparison may be performed at check unit 314 in any of the ways described herein for checking the output from the fragment processing passes. The filter 313 may similarly direct the outputs of the geometry units to the check unit for verification. On receiving output data from geometry units in respect of a given frame, the filter is configured to direct that output data to check unit 314.

The check unit is configured to compare the output data from different geometry processing passes of the same frame. The output data may be from the same or different geometry units. In some examples, the output data is received from designated mission and safety processing units.

In some examples, the check unit 314 is configured to directly compare the output data received for different geometry processing passes of the same frame—for instance, the check unit may stream the output data from different passes and directly compare the data (e.g. at a bit, byte, word, or any other suitable level). This is shown at 606 in FIG. 6. The comparison of the output streams may be performed at the fault detection unit 316 of the check unit 314. One or more buffers may be provided at the check unit or elsewhere at the GPU in order to enable the check unit to compensate for a time offset between the output data streams received at the check unit (e.g. due to the geometry processing at one geometry unit being ahead of the geometry processing at another geometry unit or a single geometry unit being configured to sequentially process a frame first and second times). By performing such direct comparison of the output streams from geometry units, the processed geometry data (typically transformed vertex data and tile lists) is generally substantially smaller than the output from fragment processors and a direct comparison of output data can be performed quickly and efficiently at the GPU.

In some examples, the check unit 314 is configured to, for each geometry processing pass, form one or more signatures which are characteristic of the output data received from the respective geometry unit. The check unit is configured to compare the signatures formed in respect of each geometry processing pass so as to verify that the geometry processing performed in each pass is in agreement. In some examples a signature is formed in respect of each write by the geometry unit to parameter buffer 312. The fault detection unit 316 may be configured to perform the comparison of signatures. Signature(s) generated for a geometry pass may be stored at data store 315 for subsequent use (e.g. for comparison with the signature of another pass in respect of the same frame). The check unit may perform, for example, a checksum, a CRC, a hash or a fingerprint calculation on the output data. The one or more signatures generated for a geometry pass provide an expression of the processing performed on the geometry data for a frame by a geometry unit in a more compact form than the output data from that geometry unit itself so as to facilitate comparison of the output data provided on different geometry processing passes. A fault detection unit 316 of the check unit 314 is configured to compare the signatures formed at the check unit in respect of a given frame. The comparison of signatures could be performed at any suitable level of granularity—for example, at a bit, byte, word level.

The check unit may comprise a plurality of check unit instances—for example, each check unit instance may be configured to receive output data from a different subset of processing units of the GPU, and/or separate check units may be provided for checking geometry and fragment processed data. The check unit operates on at least the processed data generated by a geometry unit processing the geometry data for a frame. The check unit may additionally operate on memory addresses and/or control data comprised in the output from the geometry unit—this can help the validation operations described herein to identify a wider range of faults.

The fault detection unit 316 is configured to raise 607 a fault signal 317 on determining that the geometry processing performed on different passes of the same frame do not match. As described, such comparison could be performed, for example, by comparing the geometry processed outputs directly and/or by comparing signatures characteristic of geometry processed outputs. A fault could potentially lead to a safety violation at the GPU—whether or not fragment processing is protected according to the redundant approach described herein. For example, a fault in the geometry calculations performed in respect of the instrument cluster shown in FIG. 2 could cause corruption of safety critical elements of the instrument cluster, such as the speedometer.

The fault signal 317 raised in respect of an error in geometry processing may be provided in any suitable manner. A fault signal indicates that the processed output from different geometry passes of the same frame are not the same and therefore the processed output from one or more of the geometry unit(s) that generated those processed outputs is invalid. Such a fault signal may be provided as an output of the GPU 300 and/or it may be used internally at the GPU. For example, a fault signal raised in respect of an error in geometry processing may cause the protected geometry processing to be restarted—e.g. by one or more of: resubmitting the geometry data to a pair of mission and safety geometry units; by resubmitting the geometry data twice more to a geometry unit; and by resubmitting the geometry data to any two available geometry units of the GPU. The fault signal 317 may be one or more of: control data; data written out to memory 306; and data written to a register or memory of the GPU or a system to which the GPU is connected. The output of geometry unit(s) configured to process the same geometry data may differ due to transient events such as ionizing radiation or voltage spikes, or permanent errors due to bugs in some combination of hardware, software and firmware.

The fault detection unit 316 is operable to compare output data generated on different geometry passes of the same frame. As has been described, two or more geometry units may be arranged to process the same frame. The processing performed on different passes may or may not be concurrent. If two geometry processing passes are performed at two different geometry units, comparing the output data generated by those geometry units indicates whether the processing performed by the pair of geometry units is in agreement: a fault signal indicates that a fault occurred at one of the geometry units of the pair but does not indicate which unit experienced the fault.

If a group of three or more geometry units are arranged to process the same frame, comparing the output data from those geometry units indicates whether the processing performed by the geometry units is in agreement. When the processed output of one of the group of geometry units does not match the output of the other two geometry units, the fault signal indicates that a fault occurred at one of the geometry units of the group and it can further indicate at which one of the geometry units of the group the fault occurred. This is because the fault can be assumed to have occurred at the geometry unit whose output does not match the outputs from the two or more other geometry units.

If the outputs from the different geometry processing passes are the same, then the processed geometry may be considered valid and one or more of the outputs of those geometry passes may be made available for fragment processing in accordance with the principles described herein. If the outputs from different geometry processing passes of the same frame do match then no fault signal may be raised or, in some examples, a signal may be raised indicating that the outputs do match.

The fault signal raised in respect of the geometry phase may be the same or different to the fault signal raised in respect of the fragment processing phase. The fault signal raised in respect of the geometry phase may be any kind of indication that a fault has occurred, including, for example, one or more of a control message, an interrupt, a flag in control data, one or more bits set at a register, and a data packet.

The graphics processing system may be configured to write out to a data store of the GPU (e.g. parameter buffer 312) and/or memory 306 the validated output from the geometry processing phase. By writing out only one of the geometry-processed outputs generated in respect of a frame, duplication of data at the data store can be avoided. In some examples, the filter 313 is configured to cause the geometry-processed output generated at the mission geometry unit to be written 605 to the data store and/or memory 306 and to cause the processed output generated at the safety geometry unit not to be written to the data store and/or memory 306.

In some examples, the filter 313 is configured to cause the first available output from a geometry unit in respect of a frame to be written to the data store and/or memory 306. In this way, the geometry-processed output is available sooner for fragment processing. In some examples, the fragment processing of the tiles of a frame may commence as soon as a geometry-processed output is available for a frame without waiting for validation of that geometry-processed output; should that output be subsequently found invalid the fragment processing may be abandoned and the invalid geometry-processed output discarded (e.g. the fragment processor(s) 320 performing that processing may be flushed).

In some examples, the output of the last geometry processing pass for a frame may be written to the data store and/or memory 306 with the output of earlier passes being discarded. In this way, once the output of the last processing pass is known, all of the output data is available for comparison at the fault detection unit. This can avoid unnecessary data transfers around the GPU and writes to the cache.

Tiling may be performed twice 608 for all tiles of a frame, including both protected and non-protected tiles. This is because errors in tiling could, for example, lead to safety-critical elements being included within non-protected tiles. In examples where the tiling of processed geometry data is performed at the geometry unit, the duplication of tiling could be achieved through the duplication of geometry processing at one or more geometry units in accordance with the principles described above. In examples where the tiling of processed geometry data is performed outside the geometry unit, the unit performing that tiling repeats the tiling for the frame at least twice. Tiling may be performed twice for all tiles of a frame, including both protected and non-protected tiles. Such repetition may be performed according to any of the approaches described herein for the repetition of geometry processing, with the output of different tiling passes being provided (e.g. through appropriate direction of data by filter 313) to the check unit 314 for verification 609 and a fault signal 317 being raised 610 should the output of those different tiling passes not match. In some examples—such as the example shown in FIG. 3—two or more tiling engines 310 are provided. One of the tiling engines may be designated a mission tiling engine and one of the tiling engines may be designated a safety tiling engine in accordance with any of the approaches described herein. The chip area consumed by the tiling engine is usually a small proportion of the total chip area of the GPU and so there is not a substantial area cost in providing additional tiling engines which duplicate tiling over all tiles of a frame, including non-protected tiles.

A list of the elements present in each tile of the frame to be rendered may be written 611 to a data store (e.g. the parameter buffer 312 at the GPU cache 311) on the output of the two tiling passes being verified at the check unit.

A graphics processing system configured in accordance with the principles described herein may be configured to render protected tiles so as to meet a predefined safety level in respect of the processing performed for those tiles. The graphics processing system may concurrently process non-protected tiles on a non-protected path which does not meet the predefined safety level. For example, the graphics processing system may be certified to meet the ASIL B or ASIL D standards of ISO 26262 in respect of the rendering of protected tiles.

Graphics processing systems configured in accordance with examples described herein may have one or more advantages over conventional systems (such as GPUs in a dual lockstep configuration) which perform protected rendering by simply repeating the rendering of an entire frame.

Firstly, by repeating fragment processing only of those tiles that include safety critical elements, the system can offer substantially improved performance over systems that must repeat fragment processing over an entire frame in order to protect safety critical elements of the scene to be rendered.

Secondly, the system may offer flexibility over existing systems because, depending on the scene submitted for rendering, the system may perform protected fragment processing of some, all or none of the tiles. This allows application developers to protect only the safety critical parts of a scene to be rendered and make efficiency savings by not protecting parts of a scene which are not safety critical.

Thirdly, whilst protected fragment processing is performed on a per-tile basis, the geometry phase for a frame as a whole is protected which can ensure that errors occurring in geometry calculations relating to elements present in non-protected tiles do not introduce errors into the rendering of protected tiles. Since substantially more chip area is typically provided for fragment processing than for geometry processing, providing additional geometry units in accordance with some of the examples described herein (e.g. in which concurrent processing of geometry passes is performed for a frame at different geometry units) does not substantially increase the total GPU area. And since the processing time consumed by fragment processing is typically substantially greater than the processing time consumed by geometry processing, sequentially repeating geometry processing in accordance with some of the examples described herein (e.g. in which geometry passes are repeated for a frame at the same geometry unit) does not substantially increase the time taken to process a frame.

Fourthly, the fault reaction time of the system may be substantially reduced because faults during fragment processing can be detected at the completion of an individual tile rather than after a complete render of a frame. In some examples the fault reaction time of the system can be reduced further by checking for faults before fragment processing of a tile is complete (e.g. by checking signatures generated over one or more buffer writes performed during fragment processing).

Fifthly, the memory bandwidth consumed when performing protected rendering of a frame may be reduced because for each protected tile the output of only one of the fragment processing passes (e.g. from the mission processing unit) may be written out to memory. Furthermore, by concurrently processing protected tiles at different processing units, the use of a common cache at the GPU can prevent costly double-fetching of data (e.g. texture data) from memory because both processing units can use the same data fetched for a given fragment processing operation. If double-fetch does occur it is only in respect of protected tiles and not the whole frame.

Sixthly, because the present system may allow protected rendering to be performed with fewer fragment processing operations, the power consumption of a GPU configured in accordance with the principles described herein may be lower than that of conventional protected GPUs.

Seventhly, an application developer may enable protected rendering of safety critical parts of a scene without being required to make significant changes to their application (e.g. a software or firmware process which submits scene geometry to a GPU for rendering). In some examples, a process need merely set a flag or other identifier in respect of a draw call to the GPU (e.g. by means of an API cooperating with a driver for the GPU) to indicate that the geometry to which the draw call relates is safety critical and is to be rendered on the protected path. This avoids the need to handle the protected rendering in an application itself—e.g. by submitting draw calls twice and/or causing different parts of a scene to be separately rendered then subsequently combined at a frame buffer before being written to a display.

The graphics processing systems and data processing systems of FIGS. 2 to 5 and 7 are shown as comprising a number of functional blocks. This is schematic only and is not intended to define a strict division between different logic elements of such entities. Each functional block may be provided in any suitable manner. It is to be understood that intermediate values described herein as being formed by graphics processing systems need not be physically generated by the graphics processing systems at any point and may merely represent logical values which conveniently describe the processing performed by a graphics processing system between its input and output.

A graphics processing unit described herein may be embodied in hardware on an integrated circuit. The graphics processing systems described herein may be configured to perform any of the methods described herein.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

A processor, computer, or computer system may be any kind of device, machine or dedicated circuit, or collection or portion thereof, with processing capability such that it can execute instructions. A processor may be any kind of general purpose or dedicated processor, such as a CPU, GPU, vector processor, tensor processor, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

There may be provided a method of manufacturing, at an integrated circuit manufacturing system, a graphics processing unit as described herein. There may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 7.

Figure 7:
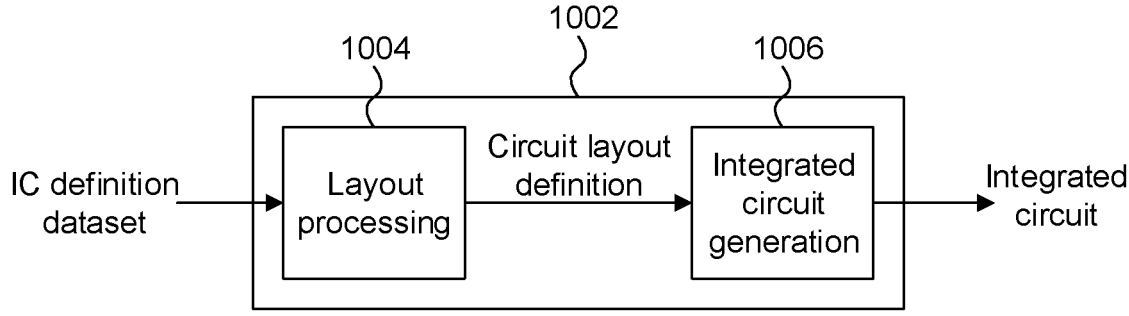
FIG. 7 is a schematic diagram of an integrated circuit manufacturing system.

FIG. 7 shows an example of an integrated circuit (IC) manufacturing system 1002 which is configured to manufacture a graphics processing unit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 1002 to manufacture an integrated circuit embodying a graphics processing unit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing unit for performing tile-based rendering of a scene, wherein a rendering space used to render a frame to be rendered is divided into a plurality of tiles, the graphics processing unit comprising:

a geometry engine configured to:

receive geometry data describing primitives of the scene to be rendered and an indication of which of the primitives of the scene are safety-critical; and in a geometry processing phase:

in dependence on the received geometry data, identify which of the primitives of the scene at least partially overlap with each tile of the plurality of tiles of the frame to be rendered; and in dependence on the received indication, mark as protected tiles those tiles of the plurality of tiles which are at least partially overlapped by one or more primitives of the scene that are indicated to be safety-critical elements; and output, for subsequent use in a fragment processing phase, information indicating which of the plurality of tiles are marked as protected tiles;

wherein the geometry engine is configured to perform the geometry processing phase first and second times for the frame to be rendered so as to, respectively, generate first and second geometry-processed outputs for comparison to determine whether the first and second geometry-processed outputs match;

a fragment processing engine configured to, in the fragment processing phase, in dependence on the information indicating which of the plurality of tiles were marked as protected tiles in the geometry processing phase:

process each of the protected tiles first and second times at one or more physical cores of the graphics processing unit so as to, respectively, generate first and second fragment-processed outputs for comparison to determine whether the first and second fragment-processed outputs match, and process each non-protected tile of the plurality of tiles a single time, non-protected tiles being those tiles of the plurality of tiles which were not marked as protected tiles;

wherein the graphics processing unit is operable to, in the event that the first and second geometry-processed outputs generated for the frame match and the respective first and second fragment-processed outputs generated for each of the protected tiles match, generate a rendered output for the frame using processed protected tiles of the plurality of tiles and processed non-protected tiles of the plurality of tiles.

2. The graphics processing unit as claimed in claim 1, wherein the graphics processing unit comprises one or more physical cores each operable to perform the geometry processing phase and/or the fragment processing phase.

3. The graphics processing unit as claimed in claim 1, wherein the graphics processing unit comprises a plurality of physical cores and the fragment processing phase is performed for the first time at a first physical core of the plurality of physical cores and for the second time at a second physical core of the plurality of physical cores.

4. The graphics processing unit as claimed in claim 3, wherein the graphics processing unit is arranged to concurrently submit each protected tile to the first and second physical cores.

5. The graphics processing unit as claimed in claim 3, wherein the graphics processing unit comprises three or more physical cores and is configured such that the second physical core is constrained to be any physical core of the plurality of physical cores other than the first physical core.

6. The graphics processing unit as claimed in claim 3, further comprising a check unit configured to, for each of the protected tiles, compare the first and second fragment-processed outputs, the check unit being configured to:

form one or more first signatures which are characteristic of the output from the first physical core;

form one or more second signatures which are characteristic of the output from the second physical core; and perform the comparison of the first and second fragment-processed outputs by comparing the respective first and second signatures.

7. The graphics processing unit as claimed in claim 6, wherein the first and second physical cores are each configured to write their respective first and second fragment-processed outputs by performing one or more writes to one or more buffers at a data store and the check unit is configured to form each first signature over groups of one or more writes by the first physical core to the one or more buffers and to form each second signature over groups of one or more writes by the second physical core to the one or more buffers.

8. The graphics processing unit as claimed in claim 6, wherein the graphics processing unit is configured to allow writes by the first physical core to the one or more buffers and to prevent writes by the second physical core to the one or more buffers.

9. The graphics processing unit as claimed in claim 3, wherein the fragment processing engine is operable to write to a memory over a data bus and the graphics processing unit is configured to:

designate the first physical core as a mission physical core and the second physical core as a safety physical core;

allow writes to the memory by the mission physical core; and not allow writes to the memory by the safety physical core.

10. The graphics processing unit as claimed in claim 1, wherein the graphics processing unit comprises a check unit configured to compare the first and second geometry-processed outputs and raise a fault signal if the first and second geometry-processed outputs do not match.

11. The graphics processing unit as claimed in claim 10, wherein the geometry engine comprises a plurality of geometry units and the geometry processing phase is at least partially performed for the first time at a first geometry unit of the plurality of geometry units and for the second time at a second geometry unit of the plurality of geometry units.

12. The graphics processing unit as claimed in claim 11, wherein the geometry engine is operable to write to a memory over a data bus and the graphics processing unit is configured to:

designate the first geometry unit as a mission geometry unit and the second geometry unit as a safety geometry unit;

allow writes to the memory by the mission geometry unit; and not allow writes to the memory by the safety geometry unit.

13. The graphics processing unit as claimed in claim 1, wherein the graphics processing unit comprises a check unit configured to, for each of the protected tiles, compare the first and second fragment-processed outputs, the geometry engine is configured to:

perform tiling first and second times in respect of all of the tiles of a frame so as to, respectively, generate first and second tiled outputs; and at the check unit, compare the first and second tiled outputs and raise a fault signal if the first and second tiled outputs do not match.

14. The graphics processing unit as claimed in claim 1, further comprising an interface for receiving draw calls that define the primitives of the scene, the interface being configured to allow draw calls to be identified as safety-critical so as to cause the respective primitives to be handled at the graphics processing unit as safety-critical primitives.

15. The graphics processing unit as claimed in claim 14, wherein each draw call received at the interface includes an identifier indicating whether the respective primitive is a safety-critical primitive.

16. The graphics processing unit as claimed in claim 1, wherein each protected tile is for processing according to a predefined safety level.

17. The graphics processing unit as claimed in claim 1, the geometry processing engine being further configured to, in the geometry processing phase, transform geometry data describing the primitives of the scene so as to form processed geometry data representing the scene from the point of view of the frame to be rendered.

18. A method of performing, at a graphics processing unit, tile-based rendering of a scene, the method comprising:

dividing a rendering space used to render a frame to be rendered into a plurality of tiles;

receiving geometry data describing primitives of the scene to be rendered and an indication of which of the primitives of the scene are safety-critical;

in a geometry processing phase:

in dependence on the received geometry data, identifying which primitives of the scene at least partially overlap with each tile of the plurality of tiles of the frame to be rendered;

in dependence on the received indication, marking as protected tiles those tiles of the plurality of tiles which are at least partially overlapped by one or more primitives of the scene that are indicated to be safety-critical primitives; and outputting, for subsequent use by a fragment processing phase, information indicating which of the plurality of tiles are marked as protected tiles;

wherein the geometry processing phase is performed first and second times for the frame to be rendered so as to, respectively, generate first and second geometry-processed outputs for comparison to determine whether the first and second geometry-processed outputs match;

in the fragment processing phase, in dependence on the information indicating which of the plurality of tiles were marked as protected tiles in the geometry processing phase:

processing each of the protected tiles first and second times at one or more physical cores of the graphics processing unit so as to, respectively, generate first and second fragment-processed outputs for comparison to determine whether the first and second fragment-processed outputs match, and processing each non-protected tile of the plurality of tiles a single time, non-protected tiles being those tiles of the plurality of tiles which were not marked as protected tiles; and in the event that the first and second geometry-processed outputs generated for the frame match and the respective first and second fragment-processed outputs generated for each of the protected tiles match, generating a rendered output for the frame using processed protected tiles of the plurality of tiles and processed non-protected tiles of the plurality of tiles.

* * * * *